US008091095B2

(12) United States Patent
Harris

(10) Patent No.: US 8,091,095 B2
(45) Date of Patent: Jan. 3, 2012

(54) EMBEDDED DRIVER FOR AN ELECTRONIC DEVICE

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 1987 days.

(21) Appl. No.: 11/115,809

(22) Filed: Apr. 26, 2005

(65) Prior Publication Data

US 2009/0100444 A1  Apr. 16, 2009

Related U.S. Application Data

(60) Provisional application No. 60/566,465, filed on Apr. 30, 2004.

(51) Int. Cl.
G06F 9/44 (2006.01)
G06F 13/00 (2006.01)
(52) U.S. Cl. ............................................ 719/321; 713/2
(58) Field of Classification Search .................. 719/321
See application file for complete search history.

(56) References Cited

U.S. PATENT DOCUMENTS

| 6,728,787 B1* | 4/2004 | Leigh ........................... 719/327 |
| 6,826,617 B1* | 11/2004 | Ansell et al. .................. 709/229 |
| 7,121,468 B2* | 10/2006 | Schmidt et al. .......... 235/462.45 |
| 7,191,153 B1* | 3/2007 | Braitberg et al. ................ 705/51 |
| 7,237,101 B1* | 6/2007 | Dono et al. ........................ 713/1 |
| 7,325,236 B2* | 1/2008 | Kubota .......................... 719/321 |
| 7,600,132 B1* | 10/2009 | Mahmoud ..................... 713/192 |
| 2002/0065872 A1* | 5/2002 | Genske et al. ................ 709/202 |
| 2002/0161939 A1* | 10/2002 | Kim et al. ......................... 710/8 |
| 2003/0120624 A1* | 6/2003 | Poppenga et al. ................ 707/1 |
| 2005/0108569 A1* | 5/2005 | Bantz et al. .................... 713/201 |
| 2005/0138645 A1* | 6/2005 | Lu ................................. 719/321 |
| 2005/0198487 A1* | 9/2005 | Zimmer et al. .................. 713/2 |

FOREIGN PATENT DOCUMENTS

WO  WO/0237226  * 5/2002

OTHER PUBLICATIONS

Tal Garfinkel, "Terra: A Virtual Machine-Based Platform for Trusted Computing", 2003.*

* cited by examiner

Primary Examiner — Lechi Truong
Assistant Examiner — Abdou Seye
(74) Attorney, Agent, or Firm — Law Office of Scott C. Harris, Inc.

(57) ABSTRACT

An electronics module with driver information electronically associated therein. The driver information may be in a memory on the electronics module. The memory may store drivers for multiple operating systems, including a virtual machine type operating system that can be used with any processor or operating system that can run the virtual machine. The memory may alternatively store website information, e.g., an address of the website and codes to use on the website to get the right driver and to validate the hardware.

7 Claims, 2 Drawing Sheets

EMBEDDED DRIVER FOR AN ELECTRONIC DEVICE

This application claims priority from provisional application No. 60/566,465, filed Apr. 30, 2004, the contents of which are incorporated herein by reference.

BACKGROUND

Electronic devices, especially those for use in computers, often require a driver file. The driver provides information that allows components of the computer and/or operating system to communicate with the electronic device. For example, taking the most common computers and architecture based computer using a Microsoft™ operating system, the operating system often includes drivers for the most common devices, with other drivers being installed from a disk. Plug-and-play operating systems allow the operating system to automatically find the device, and if a driver is available, to automatically install that driver.

When devices such as network cards or video cards are sold, they often include a driver disk to use in installing the device.

Driver disks may be inconvenient, for many reasons. It adds cost to the device, since it is an extra item that needs to be added to the package. It is easy to lose the disk. Some computers, especially small sized computers, do not have internal drives for disks.

The drivers are also often maintained on a web site. However, this requires the owner of the device to find and navigate that web site in order to determine the right location, download the driver, and install it. However, this presupposes that the user has Internet access. For example, if the driver is for a display module or a network driver, the user may not have Internet access, or even computer access, prior to the installation of the hardware.

SUMMARY

The present disclosure describes a system for embedding a driver within the actual hardware, e.g. on the card itself. According to an aspect, a number of different kinds of drivers and driver types are embedded within some hardware that is located on the card. According to another aspect, web site information is maintained, as well as write information, enabling the most recent driver to be written into special parts of the card.

DETAILED DESCRIPTION

Figure 1:
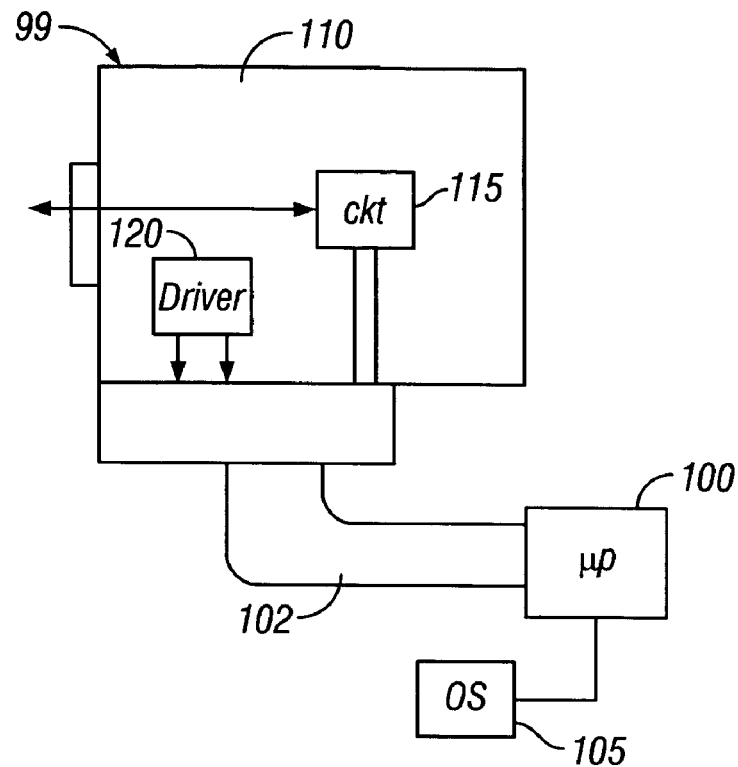
FIG. 1 shows a block diagram of the circuit in which the driver can be used.

An embodiment is shown in FIG. 1. A personal computer 99 is formed by a number of hardware devices, with only the microprocessor 100 being shown. Microprocessor 100 may by itself, or through an auxiliary chip, drive an expansion bus, here the PCI bus 102. In the example given, the microprocessor 100 is running an operating system shown as 105 which may be a plug-and-play type operating system, e.g., one available from Microsoft.

A circuit card 110 includes some expansion capabilities via hardware 115. The expansion capabilities can be for example network capabilities display capabilities for any other type of capabilities. However, in order for the operating system 105 and microprocessor 100 to use the capabilities of circuit 115, there must be a file that describes the characteristics of the circuit 115. A driver is typically used for this purpose.

Figure 2:
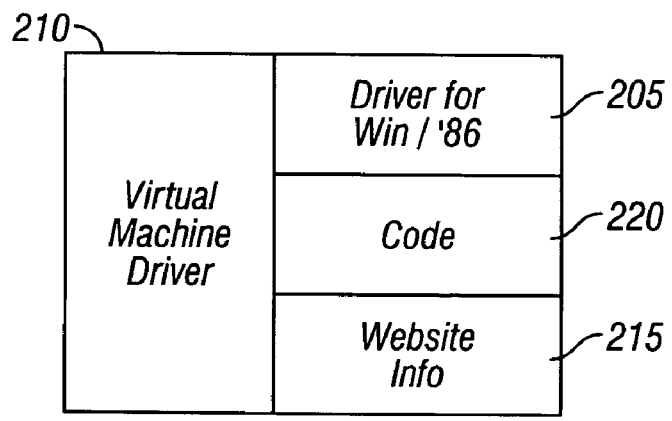
FIG. 2 shows the architecture within the memory shown in FIG. 1.

In this environment, a special memory portion 120 is also located on the card 110. The memory 120 may be a combination of read-only memory and rewritable memory. The specific architecture within driver memory 120 may be as shown in FIG. 2. In a first portion, this may include a driver 205 for the most commonly used operating system, here the Windows x86 operating system. This driver may be stored in read only memory or rewritable memory. Another driver, 210, may be a virtual machine driver. A virtual machine driver according to this aspect may be a driver that was written for a hypothetical computer environment, e.g., a hypothetical processor and/or operating system, e.g., a processor such as for the Java virtual machine. Since the driver will run on this virtual processor, any computer which can run the virtual machine simulator can also run the hardware 115 using this driver. Certain kinds of virtual machine processing is known.

Another portion of the memory shown as 215 includes website information that is information pointing to a website of the board manufacturer. This may be a link to the most recent version of the driver for the card. Also a hardwired portion 220 may be provided, with a code. This code may represent information about the specific hardware, including a serial number. The website can review this code to determine the proper driver to be returned. Also, this code can be used to prevent the use of so-called gray goods, as explained in another embodiment described herein.

In operation, the operating system, when looking for a driver for the device, looks first into the driver chip contents 120. If an appropriate driver is obtained from those contents, then that driver is used to operate the circuit 115. If no proper driver is obtained, then the system investigates whether a virtual machine driver is available, and if not whether website information is available. In this way, no external drivers may need to be installed.

In another embodiment, the Virtual Machine driver is installed as a temporary measure, to get the hardware working well enough so that the computer can otherwise operate, to allow finding a more specific driver. As an alternative to a Virtual machine driver, any generic driver can be used; that is any driver that may allow driving the hardware in many different environments.

Figure 3:
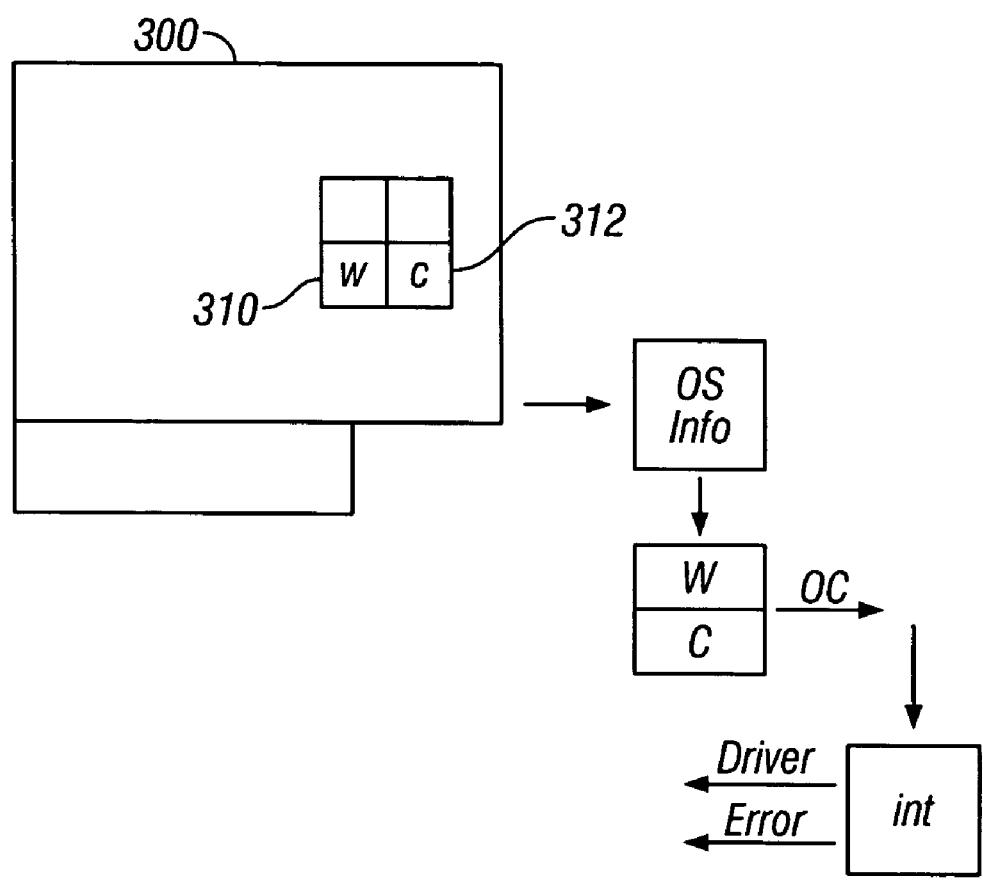
FIG. 3 shows an operational flow of carried out by the circuit of FIG. 1.

In another embodiment, a system is formed that can prevent counterfeiting and gray goods. According to this system shown in FIG. 3, it is contemplated that a special driver for the device is necessary for each installation. The device includes an onboard memory including website information shown as 310, and a special code shown as 312. The code represents the source of goods, that is it represents at least the serial number of the device and its authorized countries.

When the operating system installs the device, it follows the steps described herein. First, in order to obtain a driver, the operating system gets the information from the chip 300. The information includes a link to a website of the manufacturer. The operating system does not maintain any kind of driver for this device, but rather relies solely on the website to provide the driver. Alternatively, the operating system may have a driver, but requires the website to validate either the driver, or some running characteristic of the hardware.

The operating system provides both the information and the code to the website. In addition, the website determines from the mode of access, where the request is coming from. For example, this may be done by reverse DNS lookup or other features of determining the location from which the access was initiated. The website then consults its internal database to determine whether the information about the specific hardware matches with the location being requested. If so, it returns a driver via a download to the operating system for use in driving the hardware. If not, the website determines an error, which may include information indicating that the hardware is being used outside of its desired location.

In order to ensure that the hardware would still be usable if the manufacturer went out of business, either a driver, or a special unlock code, could be placed in escrow.

Other implementations are within the disclosed embodiment.

What is claimed is:

1. A method, comprising:
on a website, receiving information into a computer from an electronic device which includes electronic circuitry thereon, said circuit being separable from said computer and also operable with said computer to carry out operations when connected to said computer;
said information received including information from a memory on said electronic circuitry, said information including a circuit code in said memory identifying at least one circuit;
said website receiving a validation request with said circuit code, determining a location from which a validation is requested, and determining whether said circuit code is authorized from said location; and
returning validation information to said electronic circuit that is required by said electronic circuitry to work properly, said validation information being sent only if said electronic information is authorized for said location from which said validation information is requested, and where said at least one circuit is prevented from any of said operations without receiving a validation of said circuit code from said web site,
wherein said website looks up said circuit code in an internal database, and determines if a location for said circuit code matches said location from which validation is requested, and returns said validation only if said location for said circuit code matches said location from which validation is requested.

2. A method as in claim 1, wherein said validation information includes an authorized driver for said device.

3. A method as in claim 1, wherein said validation information includes an electronic file which allows said device to properly operate.

4. A method as in claim 3, further comprising preventing an operating system from loading a proper driver until said validation web site has returned said validation information.

5. An apparatus, comprising:
a computer operating a website,
said website receiving information from an electronic device which includes electronic circuitry thereon into a computer,
said information received including information from a memory on said electronic circuitry, said information including a circuit code in said memory identifying at least one circuit;
said website receiving a validation request with said circuit code, determining a location from which a validation is requested, and determining whether said circuit code is authorized from said location; and
said website returning validation information to said electronic circuit that is required by said electronic circuitry to work properly, said validation information being sent only if said electronic information is authorized for said location from which said validation information is requested, and where said validation of said circuit code from said web site allows said at least one circuit to carry out its operations, and without said validation, said at least one circuit is prevented from carrying out said operations,
wherein said website looks up said circuit code in an internal database, and determines if a location for said circuit code matches said location from which validation is requested, and returns said validation only if said location for said circuit code matches said location from which validation is requested.

6. The apparatus as in claim 5, wherein said validation information includes an authorized driver for said device.

7. The apparatus as in claim 5, wherein said validation information includes an electronic file which allows said device to properly operate.

* * * * *